United States Patent

[11] 3,581,667

| [72] | Inventor | Jean Henri Bertin |
| | | Neuilly-Sur-Seine, France |
| [21] | Appl. No. | 746,671 |
| [22] | Filed | July 22, 1968 |
| [45] | Patented | Sept. 1, 1971 |
| [73] | Assignee | Bertin & Cie |
| | | Plaisir, France |
| [32] | Priority | Aug. 3, 1967 |
| [33] | | France |
| [31] | | 116,767 |

[54] SUSPENSION SYSTEMS FOR GROUND-EFFECT MACHINES
13 Claims, 6 Drawing Figs.

[52] U.S. Cl..................................................... 104/23FS,
180/116, 244/138
[51] Int. Cl..................................................... B61b 13/08,
B60v 3/04
[50] Field of Search............................................ 104/23;
188/116, 118, 119, 120, 121, 127, 124, 125;
244/138

[56] References Cited
UNITED STATES PATENTS

| 3,122,401 | 2/1964 | Fields............................ | 180/124X |
| 3,185,238 | 5/1965 | Coates........................... | 180/125 |
| 3,185,240 | 5/1965 | Eggington...................... | 180/116X |
| 3,253,667 | 5/1966 | Mackie........................... | 180/124 |
| 3,260,322 | 7/1966 | Mackie........................... | 180/124 |
| 3,266,757 | 8/1966 | Guienne......................... | 244/138 |
| 3,267,882 | 8/1966 | Rapson et al................... | 180/124X |
| 3,268,023 | 8/1966 | DiNapoli, Jr................... | 180/124X |
| 3,414,076 | 12/1968 | Bertin et al..................... | 180/124 |
| 3,174,573 | 3/1965 | Chaplin.......................... | 180/121 |
| 3,208,543 | 9/1965 | Crowley......................... | 180/116X |

*Primary Examiner*—Joseph R. Leclair
*Assistant Examiner*—James R. Garrett
*Attorney*—Stevens, Davis, Miller and Mosher ABSTRACT: A suspension system, for a ground-effect machine having a payload structure and a ground-effect plenum chamber with a top thereto, said suspension system comprising a resilient padlike formation located in the space between said structure and said top and portions of said formation having each a predetermined resistance to forces acting thereon, the respective resistances of at least two of said portions being different from one another.

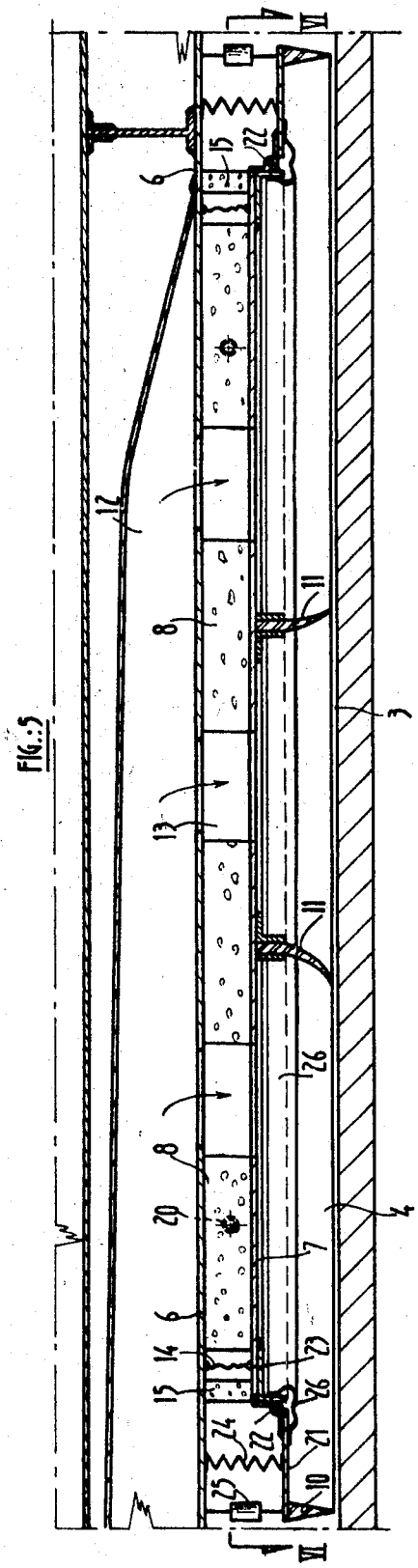
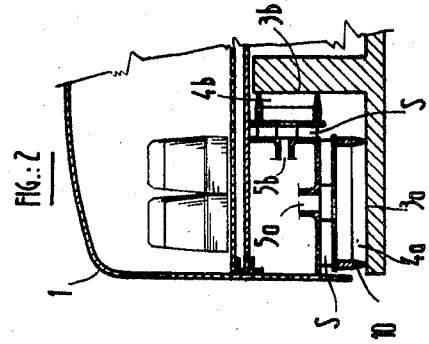
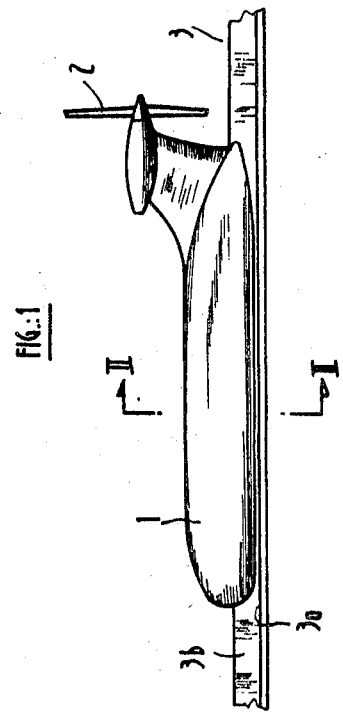

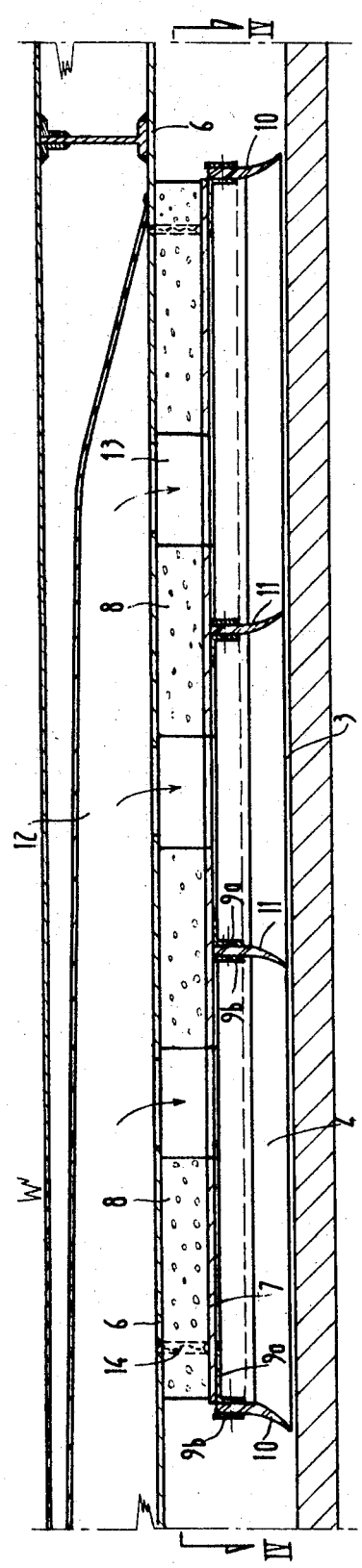
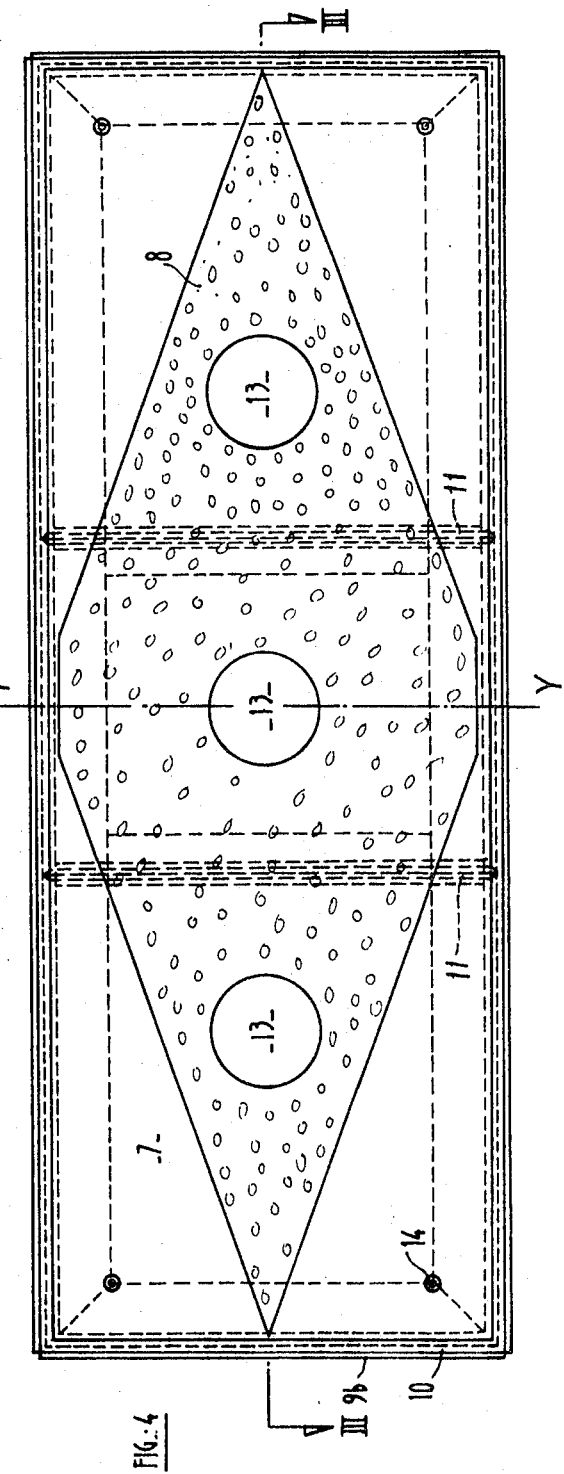
FIG. 3
FIG. 4

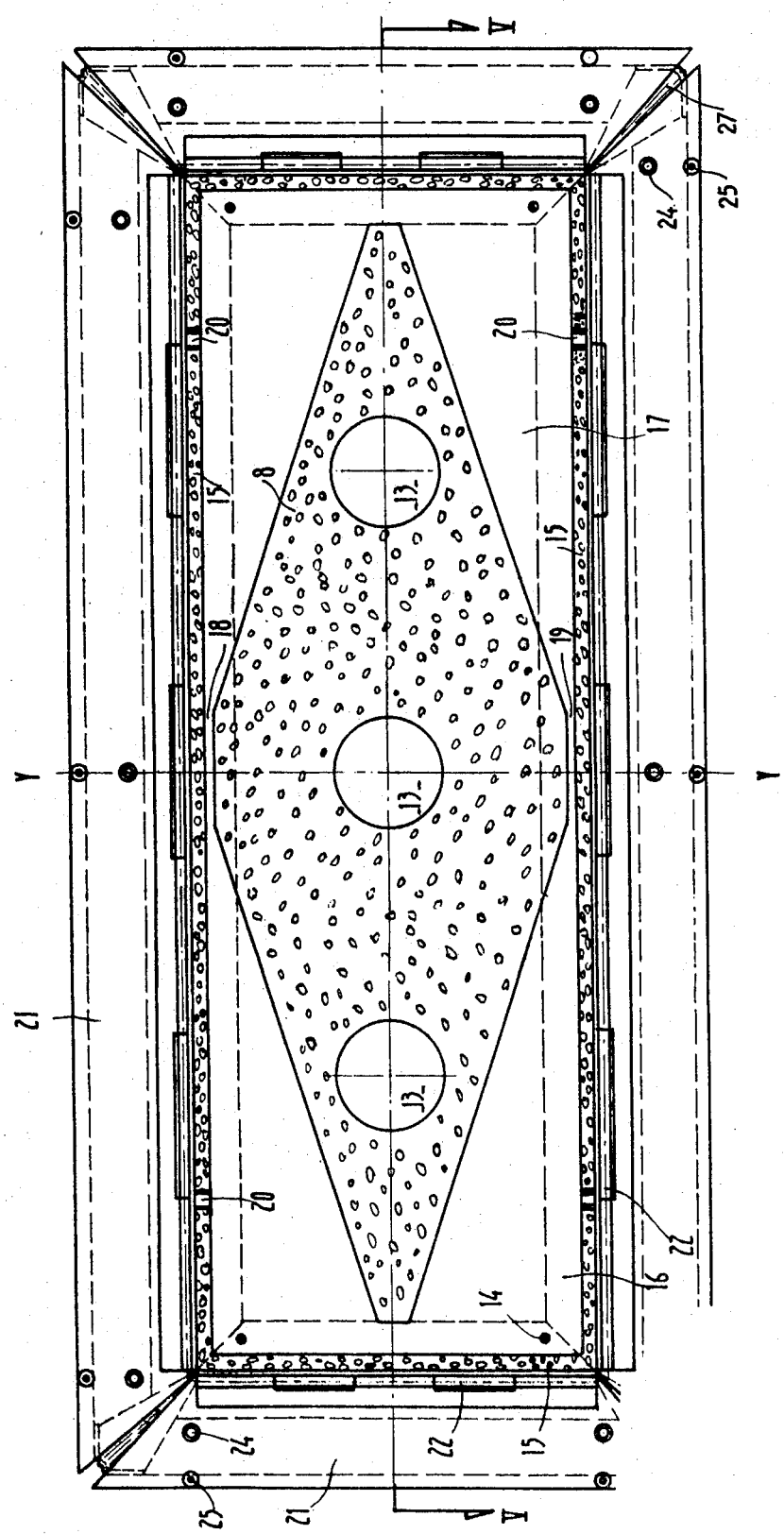

SUSPENSION SYSTEMS FOR GROUND-EFFECT MACHINES

FIELD OF THE INVENTION

The present invention relates to ground-effect machines, and in particular to suspension systems therefor.

BACKGROUND OF THE INVENTION.

It is well-known that these machines bear against the ground and, if required, against a guiding surface, the bearing being through the medium of one or more cushions of pressurized fluid. These fluid cushions are frequently contained by peripheral cushion-seals such as walls or skirts and are sometimes subdivided into individual cushions by means of further seals such as partition walls which are attached to a rigid structure or body which carries the payload of the machine. The fluid cushions themselves constitute a suspension system. The quality of this suspension system, in other words its behavior when it encounters obstacles, depends upon the properties which it possesses, of self-regulation of pressure. These properties are determined by a certain number of parameters, in particular the dimensions of the fluid cushion, the height of the daylight clearance, the feed flow rate, the operating cushion pressure and the flexibility or resilience of the skirting arrangements. In order to achieve economical operation of the machine, it is frequently necessary to limit as far as possible the height of the daylight clearance, but this kind of limitation has the drawback of increasing the cushion stiffness and thus of marring the riding qualities.

In addition, the conventional machines due to the rigidity of the body or structure supporting the payload, cannot allow for the effects produced by variations in the profile of the surface (ground, track) upon which the cushions act, between one cushion and the next. This may give rise to certain drawbacks from the point of view of stability of the said structure in the pitch and roll attitudes and, moreover, where a guided vehicle is concerned, in the yaw mode.

It is a general object of the present invention to improve the suspension characteristics of fluid cushion machines, in order to compensate for the inherent stiffness of cushions with low daylight clearance, to preserve substantially unmodified the position of the payload structure despite the differential variations occurring in the profile of the surface upon which the fluid cushions bear, and to facilitate the negotiating of curves by a guided machine.

SUMMARY OF THE INVENTION

In accordance with the present invention, there is provided a ground-effect machine comprising:

a machine body spaced apart from said bearing surface;

an arrangement movable as a whole with respect to said body and containing the fluid-cushions, said arrangement including a cover-wall spaced apart from said body and from said bearing surface and extending therebetween, and cushion-seals projecting from said cover-wall towards the bearing surface whereby a plurality of individual fluid-cushion containing enclosures are formed each of which is open at its area adjacent said bearing surface and is bounded opposite said bearing surface by a respective portion of said cover-wall; and a suspension system for supporting the machine body against the cover-wall, said system comprising a resilient device having at least two resilient portions cooperating with the fluid-cushion containing enclosures and connecting the cover-wall portions of said enclosures with the machine body, each of said resilient portions having a predetermined resistance to forces acting thereon and the resistance of one os said portions being different from that of the other of said portions.

As those skilled in the art will understand, such a distribution of the respective resistances of the resilient portions of the device promotes and accentuates angular movement between the machine body and the fluid-cushions containing arrangement, for instance whenever a pressure differential raises between the individual fluid-cushions.

According to a feature of the invention, each of said resilient portions cooperates with an individual fluid-cushion containing enclosure.

According to a preferred embodiment of the invention, the resilient portions of the resilient device comprise a padlike formation interposed between the machine body and one of the above-mentioned cover-wall portions and overlying a predetermined area of said cover-wall portion.

The padlike formation may be constituted by a solid elastic material such as rubber or the like elastomeric material.

Alternatively, said padlike formation may be constituted by a resilient material having a cellular or spongy structure, in order that the fundamental elasticity of the solid material is supplemented by that of the air entrapped in cells within said material. At least some of the cells in the material may communicate with the ambient atmosphere in order, if required, that a damping effect may be achieved in the elastic transmission of the forces.

Alternatively, said padlike formation may be constituted by a plurality of juxtaposed flexible pockets inflated with a gas such as air.

In accordance with another embodiment of the invention, the suspension system further comprises flexible wall means bounding, between the machine body and the cover-wall pertaining to the fluid-cushions containing arrangement, at least two chambers each filled with a gas such as air. Thus, there is added to the elasticity of the resilient cushioning devices that of the gas trapped in said chambers. Restricted passages linking the said chambers with one another and/or with the ambient atmosphere may be provided, where a damping effect is to be achieved in the working of the suspension system.

In another embodiment of the invention, the cover-wall pertaining to the fluid-cushions containing arrangement comprises a peripheral part hingedly connected to the rest of the cover-wall and wherefrom at least one of the cushion-seals projects towards the bearing surface, and there is provided a damped elastic suspension device attached to said peripheral part, and connecting said part with the rest of the cover-wall, or, and this preferably, directly to the machine body.

In addition to its other advantages, this arrangement provides the advantage that it introduces novel parameters which control the overall response of the suspension system.

The application of the various arrangements hereinbefore described, makes it possible to achieve considerable improvements in the vertical suspension and, if required, in the lateral suspension, of the machine, and also to give the machine better cornering characteristics (this applies of course to the case of track-guided ground-effect machines).

The fact that, in accordance with the invention, a number of parameters are involved in the control of the overall response of the suspension system, may also make it possible to use more rigid skirts which are less liable to vibration, without affecting the quality of the suspension characteristics.

The ensuing description which relates to the accompanying drawings, given by way of nonlimitative examples, will indicate how the present invention may be put into effect.

BRIEF DESCRIPTION OF THE DRAWINGS

FIG. 1 is a schematic view of a track-guided ground-effect machine to which the present invention has been applied;

FIG. 2 is a partial section on the line II–II of FIG. 1, on a slightly enlarged scale, schematically illustrating the location of the supporting and guiding cushions to which the present invention can be applied;

FIG. 3 is an axial section on the line III–III of FIG. 4, through a cushions-containing arrangement and suspension system in accordance with the present invention;

FIG. 4 is a section on the line IV–IV of FIG. 3;

FIG. 5 is an axial section on the line V–V of FIG. 6, showing a variant embodiment of the cushions-containing arrangement and suspension system; and FIG. 6 is a sectional view on the line VI-VI of FIG. 5.

DESCRIPTION OF PREFERRED EMBODIMENTS

FIGS. 1 and 2 illustrate a track-guided ground-effect machine 1 which, under the action of propulsive device 2, is propelled over a bearing surface 3 from which it is separated by a certain number of cushions of fluid at a slightly higher than ambient pressure. In the example illustrated, the machine is moving over a prepared track with respective supporting and guiding surfaces 3a and 3b, which serve to provide support through the medium of appropriate fluid cushions at 4a and 4b, supplied with pressurized fluid through passages 5a and 5b, respectively for the weight of the machine and the lateral forces imposed on it in order to guide it.

However, it is clear that the invention is in no way limited to machines of this kind and can equally well be applied to any kind of ground-effect machines whether running on a track or not and whether guided or not.

The reference S designates in a general way a suspension system which constitutes the object of the present invention and which will now be described.

Referring to FIGS. 3 and 4, the reference 6 (FIG. 3) designates part of the structure or body of a ground-effect machine. A rigid plate or cover-wall cooperates with said machine body through the medium of the elastic suspension system which will be described hereinafter. To this cover-wall, there are fixed with the aid of fillets 9a and plates 9b, seals such as peripheral skirts or walls 10 and partitioning skirts or walls 11, by means of which it is possible to define a plurality of (for example three) individual fluid-cushion containing enclosures 4 of substantially rectangular form, supplied with pressurized fluid delivered through a manifold 12 and passages 13. Each of said enclosures 4 is open at its area adjacent the bearing surface 3 and is bounded opposite said bearing surface by a respective portion of the cover-wall 7.

Between each of said cover-wall portions and the machine body 6, there is located a resilient cushioning device in the form of a padlike formation 8 overlying a predetermined area of said cover-wall portions, whereby the resilience of said cushioning device is distributed over said area. The padlike formation 8 can be made of a solid elastic material such as rubber or some other appropriate elastomer. Alternatively, it may be of the cellular type, in order that the inherent elasticity of the solid resilient material may be supplemented by that of the air entrapped in cells within said material. At least some cells could then be arranged to be open to the ambient atmosphere in order that subsequent passage of air therethrough may provide a damping function. Yet again, however, it would be possible to employ a plurality of juxtaposed flexible pockets inflated with a gas such as air.

The cover-wall 7 is attached to the machine body 6 through a series of cable-pieces 14, whereby the maximum spacing between said two components is equal to the length of said cable-pieces. Alternatively, these cable-pieces could be replaced by any other locating or stop system of equivalent function, and, equally, it would be possible to provide a stop system (not shown) limiting the minimum spacing between the cover-wall 7 and the machine body 6. Inside the limits thus defined, the cover-wall 7 can displace in relation to the machine body 6 to the extent permitted by the elasticity of the resilient padlike formation 8.

As shown in FIG. 4, the cover-wall area overlied on the whole by the padlike formation 8 forms a geometrical figure, such as a lozenge, having a dimension which increases from a minimum value at two ends of the cover-wall towards a maximum value in a zone between said ends. The result of this is that each of the portions of the padlike formation 8 forms a resilient cushioning device having a predetermined resistance to forces acting thereon and that the resistance of the resilient cushioning device cooperating with the central fluid-cushion containing enclosure is greater than the resistance of any one of those cooperating with the end enclosures located on both sides of said central enclosure.

The suspension system operates as follows:

It will be assumed, firstly, that the profile of the track or of the ground is such that there is no pressure-variation in the three individual fluid-cushions (viz. the central and both end cushions) or that the pressure varies in said three cushions in the same manner. The resultant of the pressure forces applied to the rigid plate or cover-wall 7 is or remains applied to the center of said cover-wall. Upon variation of said pressure, the various portions of the padlike formation 8 will compress or expand, therefore, in a uniform manner in a direction perpendicular to the horizontal plane through the line IV-IV in FIG. 3.

Let us now suppose that the profile of the track or the ground is such that the cushion pressure has increased in one of the end cushions, decreased in the other end cushion, and has remained the same in the central cushion. The point of application of the resultant of the pressure forces applied to the cover-wall 7 is no longer the center of said cover-wall but is offset with respect to said center. Therefore there is a tendency for rotation of the cover-wall 7 about a transverse horizontal axis Y-Y passing through the center of said cover-wall in much the same way as if cover-wall 7 had actually been provided with a physical axis about which to pivot. Due to the relatively lower resistance of the end portions of padlike formation 8 to forces acting thereon, actual rotation can take place about axis Y-Y with considerable angular amplitude.

FIGS. 5 and 6 relate to a variant embodiment of the aforedescribed suspension system. In addition to the portions of padlike resilient formation 8, the suspension system further comprises a resilient peripheral border 15 surrounding the padlike formation 8 but separated therefrom. Thus, at either side of the transverse axis Y-Y of the cover-wall 7, there are bounded two chambers 16 and 17, filled by any convenient means with a gas such as air for example and communicating with one another, as FIG. 6 illustrates, through restricted passages 18 and 19.

The border 15 is pierced, at intervals, by restricted passages 20 which allow the chambers 16 and 17 to communicate with the ambient atmosphere.

The fluid-cushions containing arrangement also exhibits certain differences with respect to the arrangement described earlier. The cover-wall now comprises a rigid plate 7 and peripheral plates 21 articulated through hinges 22 to fillets 23 fixed to said rigid plate 7. Plates 21 are also directly connected to the body 6 of the machine through the medium of a damping elastic suspension device illustrated schematically by spring 24 and dashpot 25. Means such as a flexible membrane 26 ensure that the hinges 22 are sealed. Sealing webs 27 are also provided at the corners of the cushion.

The suspension system operates as follows:

When the cover-wall 7 undergoes a translatory movement in a direction perpendicular to its own plane, the air contained in the chambers 16 and 17 acts as a pneumatic cushion whose elasticity is added to that of the padlike formation 8.

When the cover-wall 7 undergoes an angular movement about transverse axis Y-Y, the volumes of the chambers 16 and 17 vary in opposite senses. The air contained in one of these chambers tends to flow into the other but the flow is restricted by the presence of the passages 18, 19. As in the case of a pure translatory movement, the fundamental elasticity of the air is added to that of the padlike formation 8, the presence of the restricted passages 18, 19 enabling a damping effect to be achieved in the working of the suspension system.

In both cases (translatory or angular movement), the restricted passages 20 connecting the chambers 16 and 17 with the atmosphere enable a supplementary damping effect to be produced.

The overall response of the suspension system is thus a function of the fundamental resilience of the skirts 10, of the response of the mechanical device 24, 25 of the response of resilient padlike cushioning device 8, and of the pneumatic resilience introduced by the presence of the air chambers 16 and 17.

Thus, numerous parameters can influence the overall response of the system. Thus, by selecting appropriate values in these different parameters, it is possible to achieve a predetermined overall response while still complying with other conditions such as having recourse to relatively rigid skirts which have the advantage of being less susceptible to vibrations.

The machine equipped with the suspension system described will follow irregularities in the track or terrain over which it is travelling much more easily than conventional ground-effect machines. Its vertical suspension characteristics and, if required, its lateral suspension characteristics too, as well as its cornering properties, are improved, and this still further increases the comfort and safety it offers to the passenger.

Obviously, the embodiments described are merely examples and are open to modification within the scope of the accompanying claims.

I claim:

1. A ground-effect machine movable along a bearing surface with the interposition of a plurality of fluid-cushions, said machine comprising:
a machine body spaced apart from said bearing surface; a single unit support structure movable as a whole with respect to said body and containing the fluid-cushions, said support structure including a unitary rigid fluidtight cover-wall spaced apart from said body and from said bearing surface and extending therebetween, and cushion-seals projecting from said cover-wall towards the bearing surface whereby a plurality of individual fluid-cushion containing enclosures are formed each of which is open at its area adjacent said bearing surface and is bounded opposite said bearing surface by a respective portion of said cover-wall; and a suspension system interposed between said machine body and said unitary cover-wall, said system comprising a resilient device having at least two resilient portions extending in parallel relationship from different portions of said unitary cover-wall to corresponding portions of said machine body, each of said resilient portions having a predetermined bias and the bias of one of said resilient portions being greater than that of the other of said resilient portions; the said one resilient portion of greater bias being located adjacent to the center of the unitary rigid cover-wall and the lower bias resilient portion being relatively remote from said center.

2. A machine as claimed in claim 1, wherein each of said resilient portions cooperates more effectively with a respective one of said individual fluid-cushion containing enclosures than with the others.

3. A machine as claimed in claim 2, wherein said cover-wall bounds at least three fluid-cushion containing enclosures, namely at least one central enclosure and two end enclosures arranged at either side of said central enclosure, and wherein the bias of the portion of the resilient device cooperating with the central enclosure is greater than the bias of any one of the portions of the resilient device cooperating with the end enclosures.

4. A machine as claimed in claim 3, wherein the suspension system further comprises a resilient border bounding, between said machine body and said cover-wall, at least two gas-filled chambers which respectively cooperate with said fluid-cushion containing end enclosures.

5. A machine as claimed in claim 2, wherein said resilient device comprises a padlike formation interposed between the machine body and said respective cover-wall portions and overlying a predetermined area of said cover-wall portion, whereby the resilience of said resilient device is distributed over said area.

6. A machine as claimed in claim 5, wherein the area of the cover-wall overlied by one of said resilient portions is different from the area overlied by at least another of said resilient portions.

7. A machine as claimed in claim 6, wherein said cover-wall bounds at least three fluid-cushion containing enclosures, namely at least one central enclosure and two end enclosures arranged at either side of said central enclosure, and wherein the overlied area of the cover-wall portion of the central enclosure is greater than each of the overlied areas of the end enclosures.

8. A machine as claimed in claim 7, wherein the cover-wall area overlied on the whole by the resilient portions forms a geometrical figure having a transverse dimension which increases from a minimum value at both ends of the cover-wall towards a maximum value in a zone spaced from and between said ends.

9. A machine as claimed in claim 1, wherein the suspension system further comprises a resilient border bounding, between said machine body and said cover-wall, at least two gas-filled chambers.

10. A machine as claimed in claim 9, further comprising restricted passage means wherethrough each of said chambers communicates with the ambient atmosphere.

11. A machine as claimed in claim 9, further comprising restricted passage means wherethrough said chambers communicate with one another.

12. A machine as claimed in claim 1, wherein said cover-wall comprises a peripheral part hingedly connected to the rest of the cover-wall and wherefrom at least one of said cushion-seals projects towards the bearing surface, said machine further comprising a damped elastic suspension device attached to said peripheral part.

13. A machine as claimed in claim 12, wherein said damped elastic suspension device connects together said peripheral part and said machine body.